(12) United States Patent  
Murphy

(10) Patent No.: US 7,489,875 B2  
(45) Date of Patent: *Feb. 10, 2009

(54) SYSTEM AND METHOD FOR MULTIPLE BIT OPTICAL DATA TRANSMISSION IN MEMORY SYSTEMS

(75) Inventor: Tim Murphy, Boise, ID (US)

(73) Assignee: Micron Technology, Inc., Boise, ID (US)

(*) Notice: Subject to any disclaimer, the term of this patent is extended or adjusted under 35 U.S.C. 154(b) by 135 days.

This patent is subject to a terminal disclaimer.

(21) Appl. No.: 11/432,015

(22) Filed: May 10, 2006

(65) Prior Publication Data

US 2006/0204247 A1     Sep. 14, 2006

Related U.S. Application Data

(63) Continuation of application No. 10/215,505, filed on Aug. 9, 2002, now Pat. No. 7,254,331.

(51) Int. Cl.
*H04B 10/00* (2006.01)

(52) U.S. Cl. ......................... 398/164; 398/89

(58) Field of Classification Search .................. 398/164, 398/162, 894

See application file for complete search history.

(56) References Cited

U.S. PATENT DOCUMENTS

| | | | | |
|---|---|---|---|---|
| 3,777,154 A | * | 12/1973 | Lindsey | .................. 250/227.11 |
| 4,045,781 A | | 8/1977 | Levy et al. | .................. 364/200 |
| 4,240,143 A | | 12/1980 | Besemer et al. | ............. 364/200 |
| 4,245,306 A | | 1/1981 | Besemer et al. | ............. 364/200 |
| 4,253,144 A | | 2/1981 | Bellamy et al. | ............. 364/200 |
| 4,253,146 A | | 2/1981 | Bellamy et al. | ............. 364/200 |
| 4,443,845 A | | 4/1984 | Hamilton et al. | ............ 364/200 |

(Continued)

FOREIGN PATENT DOCUMENTS

EP     0849685 A2     6/1998

(Continued)

OTHER PUBLICATIONS

Scott, Noel D. et al., "An Overview of the Visualize fx Graphics Accelerator Hardware," The Hewlett-Packard Journal, Article 4, May 1998, pp. 28-34.

(Continued)

*Primary Examiner*—Agustin Bello
(74) *Attorney, Agent, or Firm*—Dorsey & Whitney LLP

(57) ABSTRACT

The disclosed system and method data increases data transmission speed through a memory system by using optical signals comprising a plurality of wavelengths of light so that each pulse of optical signals can represent more than a single bit of data. An optical transmitter comprises multiple, separately controllable light-emitting sections which generate light at different wavelengths. A photoreceptor, comprising sections of materials responsive to light received at different wavelengths, provides an output signal corresponding to the light signals received at the different wavelengths. The photoreceptor therefore can decode the received optical signals into a multiple bit output sequence corresponding with the multiple bit sequence originally transmitted. The disclosed method and system can be used to communicate signals between a plurality of memory devices and a memory hub within a memory module or directly to a system memory controller, and/or between a plurality of memory hubs and a system memory controller.

82 Claims, 6 Drawing Sheets

U.S. PATENT DOCUMENTS

| | | | |
|---|---|---|---|
| 4,707,823 A | 11/1987 | Holdren et al. | 370/1 |
| 4,724,520 A | 2/1988 | Athanas et al. | 364/200 |
| 4,809,232 A | 2/1989 | Baumbaugh et al. | 365/221 |
| 4,813,772 A | 3/1989 | Kowel et al. | 350/388 |
| 4,823,403 A * | 4/1989 | Twietmeyer | 398/164 |
| 4,825,208 A | 4/1989 | Mueller et al. | 340/825.02 |
| 4,930,128 A | 5/1990 | Suzuki et al. | 371/12 |
| 4,953,930 A | 9/1990 | Ramsey et al. | 350/96.11 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |
| 5,307,381 A | 4/1994 | Ahuja | 375/107 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 395/575 |
| 5,355,391 A | 10/1994 | Horowitz et al. | 375/36 |
| 5,379,382 A | 1/1995 | Work et al. | 395/275 |
| 5,414,819 A * | 5/1995 | Redmond et al. | 385/17 |
| 5,423,009 A | 6/1995 | Zhu | 395/325 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,479,370 A | 12/1995 | Furuyama et al. | 365/189.12 |
| 5,493,437 A | 2/1996 | Lebby et al. | 359/152 |
| 5,497,476 A | 3/1996 | Oldfield et al. | 395/439 |
| 5,502,621 A | 3/1996 | Schumacher et al. | 361/760 |
| 5,532,856 A | 7/1996 | Li et al. | 359/118 |
| 5,544,319 A * | 8/1996 | Acton et al. | 709/246 |
| 5,544,345 A * | 8/1996 | Carpenter et al. | 711/150 |
| 5,566,325 A | 10/1996 | Bruce, II et al. | 395/494 |
| 5,568,574 A * | 10/1996 | Tanguay et al. | 385/14 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,608,264 A | 3/1997 | Gaul | 257/734 |
| 5,623,534 A | 4/1997 | Desai et al. | 379/59 |
| 5,638,334 A | 6/1997 | Farmwald et al. | 365/230.03 |
| 5,659,798 A | 8/1997 | Blumrich et al. | 395/846 |
| 5,706,224 A | 1/1998 | Srinivasan et al. | 365/49 |
| 5,715,456 A | 2/1998 | Bennett et al. | 395/652 |
| 5,729,709 A | 3/1998 | Harness | 395/405 |
| 5,787,475 A | 7/1998 | Pawlowski | 711/137 |
| 5,818,844 A | 10/1998 | Singh et al. | 370/463 |
| 5,818,984 A * | 10/1998 | Ahmad et al. | 385/14 |
| 5,819,304 A | 10/1998 | Nilsen et al. | 711/5 |
| 5,822,255 A | 10/1998 | Uchida | 365/194 |
| 5,831,467 A | 11/1998 | Leung et al. | 327/319 |
| 5,832,250 A | 11/1998 | Whittaker | 395/471 |
| 5,875,352 A | 2/1999 | Gentry et al. | 395/843 |
| 5,875,454 A | 2/1999 | Craft et al. | 711/113 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,023,726 A | 2/2000 | Saksena | 709/219 |
| 6,026,226 A | 2/2000 | Heile et al. | 395/500.13 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,078,451 A | 6/2000 | Ioki | 360/51 |
| 6,079,008 A | 6/2000 | Clery, III | 712/11 |
| 6,088,774 A | 7/2000 | Gillingham | 711/167 |
| 6,098,158 A | 8/2000 | Lay et al. | 711/162 |
| 6,101,151 A | 8/2000 | Watanabe et al. | 365/233 |
| 6,105,075 A | 8/2000 | Ghaffari | 710/5 |
| 6,105,088 A * | 8/2000 | Pascale et al. | 710/100 |
| 6,111,757 A | 8/2000 | Dell et al. | 361/737 |
| 6,125,431 A | 9/2000 | Kobayashi | 711/154 |
| 6,131,149 A | 10/2000 | Lu et al. | 711/167 |
| 6,134,624 A | 10/2000 | Burns et al. | 710/131 |
| 6,137,709 A | 10/2000 | Boaz et al. | 365/51 |
| 6,144,327 A | 11/2000 | Distinti et al. | 341/126 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,226,729 B1 | 5/2001 | Stevens et al. | 711/171 |
| 6,229,712 B1 | 5/2001 | Munoz-Bustamante et al. | 361/783 |
| 6,229,727 B1 | 5/2001 | Doyle | 365/63 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,253 B1 | 7/2001 | Oberlaender et al. | 365/230.02 |
| 6,256,692 B1 | 7/2001 | Yoda et al. | 710/104 |
| 6,266,730 B1 | 7/2001 | Perino et al. | 710/126 |
| 6,272,609 B1 | 8/2001 | Jeddeloh | 711/169 |
| 6,285,349 B1 | 9/2001 | Smith | 345/147 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,343,171 B1 | 1/2002 | Yoshimura et al. | 385/50 |
| 6,344,664 B1 | 2/2002 | Trezza et al. | 257/82 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,366,375 B1 * | 4/2002 | Sakai et al. | 398/43 |
| 6,366,529 B1 | 4/2002 | Williams et al. | 365/239 |
| 6,367,074 B1 | 4/2002 | Bates et al. | 717/11 |
| 6,370,068 B2 | 4/2002 | Rhee | 365/196 |
| 6,373,777 B1 | 4/2002 | Suzuki | 365/230.03 |
| 6,381,190 B1 | 4/2002 | Shinkai | 365/230.03 |
| 6,392,653 B1 | 5/2002 | Malandain et al. | 345/501 |
| 6,401,213 B1 | 6/2002 | Jeddeloh | 713/401 |
| 6,405,273 B1 | 6/2002 | Fleck et al. | 710/131 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,434,639 B1 | 8/2002 | Haghighi | 710/39 |
| 6,434,654 B1 | 8/2002 | Story et al. | 710/307 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,377 B1 | 9/2002 | Farnworth et al. | 710/300 |
| 6,453,393 B1 | 9/2002 | Holman et al. | 711/154 |
| 6,457,116 B1 | 9/2002 | Mirsky et al. | 712/16 |
| 6,462,978 B2 | 10/2002 | Shibata et al. | 365/63 |
| 6,463,059 B1 | 10/2002 | Movshovich et al. | 370/389 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |

| Patent No. | Date | Inventor | Class |
|---|---|---|---|
| 6,479,322 B2 | 11/2002 | Kawata et al. | 438/109 |
| 6,490,188 B2 | 12/2002 | Nuxoll et al. | 365/63 |
| 6,493,784 B1 * | 12/2002 | Kamimura et al. | 710/309 |
| 6,496,909 B1 | 12/2002 | Schimmel | 711/163 |
| 6,501,471 B1 | 12/2002 | Venkataraman et al. | 345/424 |
| 6,502,161 B1 | 12/2002 | Perego et al. | 711/5 |
| 6,505,287 B2 | 1/2003 | Uematsu | 711/170 |
| 6,507,899 B1 | 1/2003 | Oberlaender et al. | 711/169 |
| 6,523,092 B1 | 2/2003 | Fanning | 711/134 |
| 6,523,093 B1 | 2/2003 | Bogin et al. | 711/137 |
| 6,526,498 B1 | 2/2003 | Mirsky et al. | 712/11 |
| 6,539,490 B1 | 3/2003 | Forbes et al. | 713/401 |
| 6,552,304 B1 | 4/2003 | Hirose et al. | 219/216 |
| 6,552,564 B1 | 4/2003 | Forbes et al. | 326/30 |
| 6,553,479 B2 | 4/2003 | Mirsky et al. | 712/16 |
| 6,567,963 B1 * | 5/2003 | Trezza | 716/8 |
| 6,570,429 B1 | 5/2003 | Hellriegel | 327/295 |
| 6,584,543 B2 | 6/2003 | Williams et al. | 711/105 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,599,031 B2 * | 7/2003 | Li | 385/88 |
| 6,615,325 B2 | 9/2003 | Mailloux et al. | 711/154 |
| 6,622,227 B2 | 9/2003 | Zumkehr et al. | 711/167 |
| 6,623,177 B1 * | 9/2003 | Chilton | 385/88 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,636,110 B1 | 10/2003 | Ooishi et al. | 327/565 |
| 6,636,957 B2 | 10/2003 | Stevens et al. | 711/171 |
| 6,643,787 B1 | 11/2003 | Zerbe et al. | 713/400 |
| 6,646,929 B1 | 11/2003 | Moss et al. | 365/194 |
| 6,651,139 B1 * | 11/2003 | Ozeki et al. | 711/118 |
| 6,658,509 B1 | 12/2003 | Bonella et al. | 710/100 |
| 6,661,940 B2 | 12/2003 | Kim | 385/15 |
| 6,661,943 B2 | 12/2003 | Li | 385/18 |
| 6,662,304 B2 | 12/2003 | Keeth et al. | 713/400 |
| 6,665,202 B2 | 12/2003 | Lindahl et al. | 365/49 |
| 6,667,895 B2 | 12/2003 | Jang et al. | 365/63 |
| 6,681,292 B2 | 1/2004 | Creta et al. | 711/119 |
| 6,681,301 B1 | 1/2004 | Mehta et al. | 711/154 |
| 6,697,926 B2 | 2/2004 | Johnson et al. | 711/167 |
| 6,707,726 B2 | 3/2004 | Nishio et al. | 365/189.12 |
| 6,715,018 B2 | 3/2004 | Farnworth et al. | 710/300 |
| 6,718,440 B2 | 4/2004 | Maiyuran et al. | 711/137 |
| 6,721,187 B2 | 4/2004 | Hall et al. | 361/760 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,113 B2 | 6/2004 | Bhakta et al. | 365/63 |
| 6,751,703 B2 | 6/2004 | Chilton | 711/113 |
| 6,751,722 B2 | 6/2004 | Mirsky et al. | 712/15 |
| 6,752,539 B2 | 6/2004 | Colgan et al. | 385/92 |
| 6,754,117 B2 | 6/2004 | Jeddeloh | 365/201 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,772,261 B1 | 8/2004 | D'Antonio et al. | 710/301 |
| 6,775,747 B2 | 8/2004 | Venkatraman | 711/157 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,793,408 B2 | 9/2004 | Levy et al. | 385/88 |
| 6,793,411 B2 | 9/2004 | Seifert | 385/92 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,931 B2 | 11/2004 | Shih | 710/62 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,829,398 B2 * | 12/2004 | Ouchi | 385/14 |
| 6,845,409 B1 | 1/2005 | Talagala et al. | 710/20 |
| 6,910,812 B2 | 6/2005 | Pommer et al. | 385/92 |
| 6,949,406 B2 | 9/2005 | Bosnyak et al. | 438/106 |
| 6,950,956 B2 | 9/2005 | Zerbe et al. | 713/400 |
| 6,956,996 B2 | 10/2005 | Gordon et al. | 385/48 |
| 6,961,259 B2 | 11/2005 | Lee et al. | 365/63 |
| 6,980,748 B2 | 12/2005 | Leas | 398/202 |
| 6,982,892 B2 | 1/2006 | Lee et al. | 365/63 |
| 7,000,062 B2 | 2/2006 | Perego et al. | 711/5 |
| 7,016,213 B2 | 3/2006 | Reeves et al. | 365/63 |
| 7,016,606 B2 | 3/2006 | Cai et al. | 398/27 |
| 7,024,547 B2 | 4/2006 | Kartoz | 713/1 |
| 7,035,212 B1 | 4/2006 | Mittal et al. | 370/230 |
| 7,047,351 B2 | 5/2006 | Jeddeloh | 711/5 |
| 7,062,595 B2 | 6/2006 | Lindsay et al. | 710/315 |
| 7,102,907 B2 | 9/2006 | Lee et al. | 365/63 |
| 7,106,611 B2 | 9/2006 | Lee et al. | 365/200 |
| 7,106,973 B2 | 9/2006 | Kube et al. | 398/164 |
| 7,120,727 B2 | 10/2006 | Lee et al. | 711/5 |
| 7,120,743 B2 | 10/2006 | Meyer et al. | 711/118 |
| 7,136,953 B1 | 11/2006 | Bisson et al. | 710/307 |
| 7,171,508 B2 | 1/2007 | Choi | 710/307 |
| 7,200,024 B2 * | 4/2007 | Taylor | 365/64 |
| 7,254,331 B2 * | 8/2007 | Murphy | 398/70 |
| 2001/0023474 A1 * | 9/2001 | Kyozuka et al. | 711/114 |
| 2001/0034839 A1 | 10/2001 | Karjoth et al. | 713/190 |
| 2001/0039612 A1 | 11/2001 | Lee | 713/2 |
| 2002/0038412 A1 | 3/2002 | Nizar et al. | 711/170 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2003/0005223 A1 | 1/2003 | Coulson et al. | 711/118 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | 710/22 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0229734 A1 | 12/2003 | Chang et al. | 710/36 |
| 2003/0229770 A1 | 12/2003 | Jeddeloh | 711/213 |
| 2004/0015650 A1 | 1/2004 | Zumkehr et al. | 711/105 |
| 2004/0022094 A1 | 2/2004 | Radhakrishnan et al. | 365/200 |
| 2004/0024959 A1 | 2/2004 | Taylor | 711/105 |
| 2004/0044833 A1 | 3/2004 | Ryan | 711/5 |
| 2004/0123088 A1 | 6/2004 | Poisner et al. | 713/1 |
| 2004/0126115 A1 | 7/2004 | Levy et al. | 398/116 |
| 2004/0128421 A1 | 7/2004 | Forbes | 710/303 |
| 2004/0144994 A1 | 7/2004 | Lee et al. | 257/200 |
| 2004/0148482 A1 | 7/2004 | Grundy et al. | 711/167 |
| 2004/0230718 A1 | 11/2004 | Polzin et al. | 710/22 |
| 2004/0236885 A1 | 11/2004 | Fredriksson et al. | 710/100 |
| 2004/0251929 A1 | 12/2004 | Pax et al. | 326/30 |
| 2004/0268009 A1 | 12/2004 | Shin et al. | 710/310 |
| 2005/0030797 A1 | 2/2005 | Pax et al. | 365/189.12 |
| 2005/0044304 A1 | 2/2005 | James | 711/105 |
| 2005/0071542 A1 | 3/2005 | Weber et al. | 711/105 |
| 2005/0091464 A1 | 4/2005 | James | 711/167 |
| 2005/0105350 A1 | 5/2005 | Zimmerman | 365/201 |
| 2005/0146946 A1 | 7/2005 | Taylor | 365/189.05 |
| 2005/0162882 A1 | 7/2005 | Reeves et al. | 365/63 |
| 2005/0177690 A1 | 8/2005 | LaBerge | 711/154 |
| 2005/0210185 A1 | 9/2005 | Renick | 711/105 |

| | | | |
|---|---|---|---|
| 2005/0210216 A1 | 9/2005 | Jobs et al. | 711/170 |
| 2005/0216648 A1 | 9/2005 | Jeddeloh | 710/311 |
| 2005/0228939 A1 | 10/2005 | Janzen | 711/105 |
| 2005/0257021 A1 | 11/2005 | James | 711/170 |
| 2005/0268060 A1 | 12/2005 | Cronin et al. | 711/167 |
| 2006/0023528 A1 | 2/2006 | Pax et al. | 365/202 |
| 2006/0047891 A1 | 3/2006 | James et al. | 711/105 |
| 2006/0179203 A1 | 8/2006 | Jeddeloh | 710/311 |
| 2006/0179208 A1 | 8/2006 | Jeddeloh | 711/100 |
| 2006/0195647 A1 | 8/2006 | Jeddeloh | 711/100 |
| 2006/0200598 A1 | 9/2006 | Janzen | 710/58 |
| 2006/0204247 A1* | 9/2006 | Murphy | 398/139 |
| 2007/0025133 A1 | 2/2007 | Taylor | 365/63 |
| 2007/0035980 A1 | 2/2007 | Taylor | 365/63 |
| 2008/0162861 A1 | 7/2008 | Jobs et al. | 711/170 |

FOREIGN PATENT DOCUMENTS

| | | |
|---|---|---|
| JP | 2001265539 A | 9/2001 |
| WO | WO 93/19422 | 9/1993 |
| WO | WO 02/27499 A2 | 4/2002 |

OTHER PUBLICATIONS

Depari, A. et al., "*USB Sensor Network For Industrial Applications*", IEEE XPLORE, May 2004 (Abstract Only).

Gillingham, Peter, "*SLDRAM Architectural and Functional Overview*", 1997 SLDRAM Consortium, Aug. 29, 1997, pp. 1-14.

Omkar et al., "*Neural Network Controller for Minimizing Hub Shear Forces in Helicopter*", IEEE XPLORE, Sep. 1998 (Abstract Only).

Clugston, Mike, "Definition of cache", 2004, www.xreferplus.com.

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Gillett, R. et al., "Using The Memory Channel Network", Micro IEEE, vol. 17, Issue 1, Jan.-Feb. 1997 (Abstract Only).

Gommans et al., "*Applications Drive Secure Lightpath Creation Across Heterogeneous Domains*", Communications Magazine, IEEE, vol. 44, Issue 3, Mar. 2006 (Abstract Only).

Hsieh, Ming-Chia et al., "On the design of a local switch for heterogenous multi-subsystem interconnect", Oct. 1993 (Abstract Only).

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

* cited by examiner

SYSTEM AND METHOD FOR MULTIPLE BIT OPTICAL DATA TRANSMISSION IN MEMORY SYSTEMS

CROSS-REFERENCE TO RELATED APPLICATIONS

This application is a continuation of pending U.S. patent application Ser. No. 10/215,505, filed Aug. 9, 2002.

TECHNICAL FIELD

The present invention is directed to memory systems. More particularly, the present invention is directed to increasing the speed of data transmission in a memory system by using optical data transmission to simultaneously transmit multiple data bits.

BACKGROUND OF THE INVENTION

The underlying technology and benefits of optical data transmission and fiber optic technology are well known in the art and beyond. Signals in the form of light, at wavelengths both within and beyond the visible spectrum, can be transmitted through free space, a reflective wave guide such as a fiber optic medium, or similar means. Whatever medium is used, the potential bandwidth is tremendous. Moreover, as compared to electrical signals transmitted through conventional conductive wiring, problems with noise, crosstalk, and similar concerns are reduced if not eliminated. It is no surprise, therefore, that fiber optic cabling has been replacing conventional conductive cabling as the backbone of public and private data networks.

Optical data transmission can be of tremendous potential benefit not only in transmitting data between computer systems, but within computer systems as well. Optical data transmission holds great promise for reducing or eliminating bottlenecks which limit computer processing throughput. With improvements in semiconductor miniaturization and manufacturing, today's microprocessors operate at gigahertz clock speeds, while other aspects of computer design and manufacture have not kept pace. As a result, a microprocessor may run at gigahertz speeds, but be left sitting idle waiting on the computer's subsystems to respond to instructions or return data.

To name one very significant example, the response time of computer memory systems has not at all kept up with increases in microprocessor speed. "Memory latency," i.e., delays in responding to processor requests for data, is a large problem. Typical computer motherboards operate at between one hundred and three hundred megahertz, almost an order of magnitude slower than typical microprocessors. Moreover, the disparity between the speed of processor clocks and memory clocks is growing. Currently, the ratio of processor clock speed to memory clock speed typically is 8:1, but that ratio is predicted to increase to 100:1 in the next few years. Further compounding the problem is the fact that a memory system may require ten or more of its own memory clock cycles to respond to a memory retrieval request, thus, the ratio for a complete memory cycle is far worse. Today, completion of one full memory cycle may result in the waste of hundreds of processing cycles. In the near future, based on current performance trends in microprocessors, completion of a memory cycle may result in the waste of thousands of processing cycles.

Although memory latency results in part from the slower speed of memory chips themselves, an appreciable portion of this delay is because of the time required to route data from the system controller to memory modules, and within memory modules to the module's memory chips. Problems such as cross talk, skew, and similar concerns limit just how quickly data can be communicated through memory systems. In addition, while microprocessors can accommodate larger and larger data words and ranges of addresses, data and address busses have not increased commensurately. As a result, data and address signals bits must be multiplexed in order to transmit that information on existing busses, further impairing the exchange of data with memory.

Memory modules used in computer systems commonly are in the form of single in-line memory modules ("SIMMs") and double in-line memory modules ("DIMMs"). An example of a conventional SIMM memory module 10 is shown in FIG. 1. The memory module 10 includes a circuit board substrate 14 on which several memory devices 20, typically dynamic random access memories ("DRAMs"), are mounted. Terminals 24 are formed along an edge of the substrate 14, which mate with slotted connectors (not shown) typically mounted on a computer system mother-board. The terminals 24 are electrically coupled to the power and signal terminals on the memory devices 20. Also mounted on the substrate 14 may be a register 26 that stores command and address signals applied to the memory module 10 through the terminals 24 responsive to a clock signal that is also applied to the memory module 10 through the terminals 24. The register 26 then applies the command and address signals to the memory devices 20. Memory modules having a register 26 operating in this manner are known as "registered DRAM modules." However, it should be understood that memory modules often do not include the register 26, and they may include components in addition to those shown in FIG. 1.

A portion of a memory system 30 shown in FIG. 2 includes three memory modules 10a, 10b, and 10c coupled to a system controller 32 though a common data bus 34, address bus 36 and command bus 38. The system controller 32 initiates a memory operation by coupling a memory request in the form of a memory command and a memory address (generally in the form of a row address and a column address) to all of the memory modules 10a, 10b, and 10c through the command bus 38 and the address bus 36, respectively. If the memory operation is a write operation, the system controller 32 will also couple write data to the memory modules 10a, 10b, and 10c through the data bus 34. To prevent all of the memory modules 10a, 10b, and 10c from responding to the memory request, the system controller 32 also generally applies a unique chip select or similar select signal to each of the memory modules 10a, 10b, and 10c. A unique select signal is thus applied to each of the memory modules 10a, 10b, and 10c so that only the desired memory module of modules 10a, 10b, and 10c responds to the memory request.

The bandwidth of data between the system controller 32 and the memory modules 10a, 10b, and 10c can be increased by simultaneously accessing the memory devices 20 (FIG. 1) in each of the modules 10a, 10b, and 10c. For example, the sixteeen memory devices 20 included in the memory module 10a, 10b, and 10c may be divided into four sets or "ranks" of four memory devices. Data may be read from all four of the ranks responsive to a single memory read request so that data must be coupled through the data bus 34 at a rate that is four times faster than the rate at which data is coupled from each rank of the memory devices 20. However, as the operating speed of memory devices continues to increase, the bandwidth of data coupled from the memory modules 10a, 10b, and 10c may be limited by the bandwidth of the data bus 34 coupled between the system controller 32 and the memory modules 10a, 10b, and 10c.

Another factor that limits the operating speed of computer systems using the system controller 32 coupled to the memory modules 10a, 10b, and 10c through the buses 34, 36, and 38 is the need to allow for a settling time between writing data to a memory module 10a, 10b, or 10c and reading data from a memory module 10. When the system controller 32 outputs data to the memory modules, the data signals are reflected from various locations, such as the junction between the data bus 34 and terminals 24 (FIG. 1) on the substrates 14 of the modules 10. Therefore, signal induced noise is present on the data bus for a considerable period after data have been written to the memory modules 10a, 10b, and 10c. Signal induced noise is generated on the data bus for the same reason in a read operation when one of the memory modules 10a, 10b, and 10c couples data onto the data bus 34 for transfer to the system controller 32. This noise must be allowed to dissipate before data are subsequently written to or read from the memory modules 10a, 10b, and 10c or else the noise may be mistakenly interpreted as read or write data. The need to provide for a settling time read can markedly reduce the effective memory bandwidth of computer systems and other devices using memory modules.

Not only is the communication between the system controller 32 (FIG. 2) and the memory modules 10a, 10b, and 10c a concern, but comparable concerns arise within the module 10 (FIG. 1) in communications between the register 26 and memory devices 20. A basic concern is that great care must be taken in manufacturing a substrate 14 which includes workable connections (not shown) between the register 26 and the memory devices 20. In addition, because of the signal currents passing along these necessarily closely disposed signal lines, phenomena such as noise and cross-talk could result in data communications errors between the register 26 and memory devices 20. Certainly, settling time must be allowed for intramodule communications just as it must for intermodule communications, further slowing the effective speed of the system memory.

Thus, both between and within memory modules, there is therefore a need for a memory system communications technique that permits a higher bandwidth of data transfer to and from memory modules and memory devices and that reduces or eliminates delays in writing data to and reading from memory in a computer system. It is to this objective that the present invention is directed.

SUMMARY OF THE INVENTION

The system and method of the present invention increases the speed at which data can be communicated in memory systems using optical transmission media. The present invention uses an optical transmitter operable to emit optical signals comprising a plurality of wavelengths of light. One example of such an optical transmitter would be a light emitting diode having a composite bond pad comprised of sections of chemically different materials, each of which generates light at different wavelengths. Each section of the optical transmitter would have a separate input so that each section could be selectively, separately activated. As a result, pulses generated by the optical transmitter comprise light of one wavelength or a number of different wavelengths. Consequently, each pulse of the optical transmitter of the present invention can represent more than a single bit of data. Receiving the signal is a photoreceptor having sections of chemically different materials corresponding to the composition of the materials used in the optical transmitter. The sections of the photoreceptor react to the light of different wavelengths generated by the sections optical transmitter, with each section of the photoreceptor having a separate output terminal. Thus, the photoreceptor would decode the optical signals into constituent components by generating output currents at different output terminals depending on the wavelengths of the light represented in the signal sent by the optical transmitter.

The number of different data values which could be transmitted in a single optical transmitter pulse would be equal to two raised to the power of the number of sections of the optical transmitter or optical receiver, whichever is fewer. The use of a light having a plurality of wavelengths thus effectively increases the bandwidth of the optical transmission media in the memory devices, allowing that media to carry more data more quickly.

The present invention could be employed both in the communications between memory chips and a memory module register or hub, between a hub and a memory controller, or to otherwise communicate data to and from memory devices. The effective increase in bandwidth permitted by the simultaneous transmission of multiple data bits increases communications speed while avoiding concerns such as settling time delays, crosstalk, and other memory system limiting problems.

DETAILED DESCRIPTION OF THE INVENTION

Instead of communicating bits of data using conventional, conductive signal lines, embodiments of the present invention communicate bits of data using light. In particular, embodiments of the present invention use optical transmitters and receivers which are capable of generating and deciphering, respectively, compound light signals comprising signals having a plurality of wavelengths. The compound signals allow for each light signal to represent multiple bits of data, effectively increasing the bandwidth of the optical data transmission system.

Figure 1:
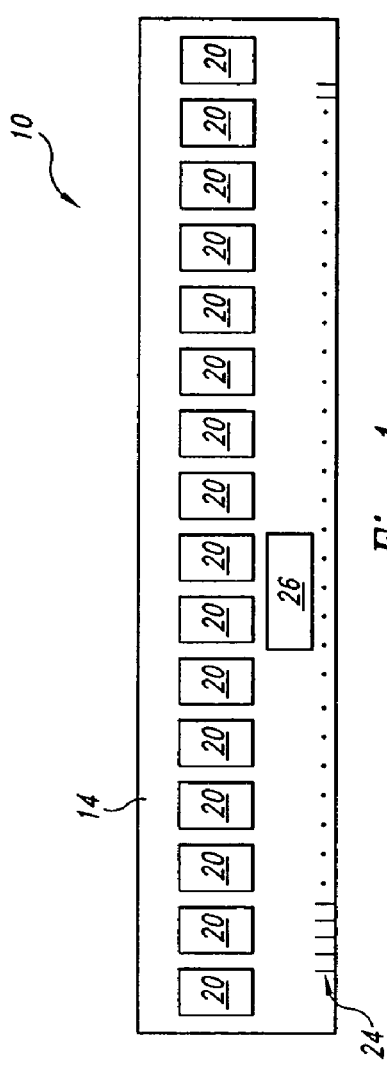
FIG. 1 is a plan view of a conventional memory module.
Figure 2:
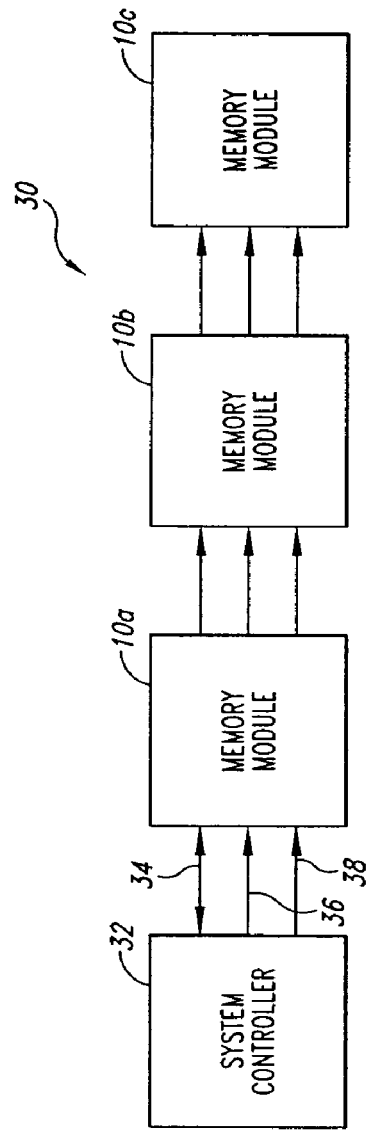
FIG. 2 is a block diagram of a portion of a conventional computer system using several of the memory modules shown in FIG. 1.
Figure 3:
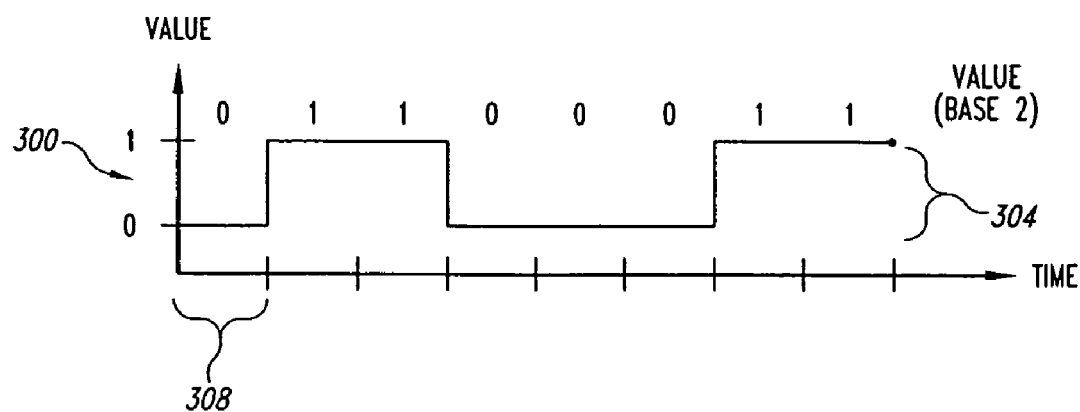
FIG. 3 is a graph depicting content of a conventional, single bit optical data transmission signal showing signal status over time measured in pulses.

FIG. 3 is a graph 300 of an example binary signal 304 generated by a monochromatic LED or other light source. In the example of FIG. 3, the signal 304 being sent represents the number "99." A conventional LED would transmit this number in binary, base two form, which could be transmitted in a single, eight-bit data byte as "01100011." The graph 300 shows this signal 304 sent over time. The unit of time 308 marked in FIG. 3 is the standard clock interval used which allows an optical transmitter and optical receiver to modulate and demodulate each one-bit signal. The signal 304 is shown as having been transmitted with the least significant bit first so that the graph reads consistently with the base two representation of the number transmitted. As the graph 300 of FIG. 3 shows, this one-byte representation of the data being sent requires eight clock intervals, one for each bit of the one-byte data word being sent.

The speed with which this data may be transmitted can be increased in two ways. First, if faster optical data transmission and reception devices could be devised, the clock speed could be increased and, thus, the clock interval 308 decreased. This would reduce the time to transmit a unit of data. Second, using an embodiment of the present invention, if more than one bit of data could be sent per clock interval 308, fewer clock intervals would be required to transmit the same quantity of data, thereby increasing the speed at which the data can be transmitted. It will be appreciated that, if the speed of the optical data transmission and reception devices can be increased, the ability to send more than one bit of data per clock interval would only further increase the overall speed of data transmission.

Each additional bit that can be transmitted during the same time interval increases the number of values that can be represented during that interval by a factor of two. Just as being able to send a one-bit representation of data during a clock interval allows for one of two values to be transmitted, being able to transmit a two-bit representation allows for one of four possible values to be represented. Similarly, being able to transmit a three-bit representation allows for one of eight possible values to be represented, being able to transmit a four-bit representation allows for one of sixteen possible values to be represented, etc. Put another way, a one-bit representation of data can send a base two digit, a two-bit representation of data can communicate a base four digit, a three-bit representation can communicate a base eight digit, etc.

Figure 4:
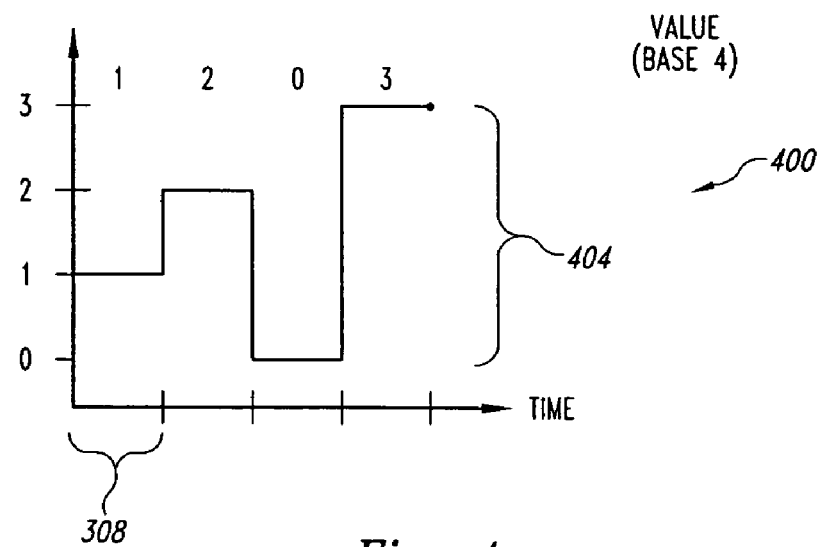
FIG. 4 is a graph depicting the content of a multiple bit optical data transmission signal showing signal status over time measured in pulses.

FIG. 4 is a graph 400 of an example signal generated by an optical transmitter capable of transmitting a two-bit representation. As in the example of FIG. 3, the signal being sent is the number "99." An optical transmitter capable of transmitting a two-bit representation can represent digits 0, 1, 2, and 3, as compared to the 0 and 1 which a one-bit representation can transmit. In base two form, "99" could be represented by eight-bit data word as "01100011," whereas in base four that same value can be represented in a four-bit half-word as "1203." The unit of time 308 depicted in FIG. 4, for which the reference numeral is chosen to be the same to denote the correspondence, is the same as shown in FIG. 3. By comparing the graph 300 of the base two signal representing the number "99" in FIG. 3 and the graph 400 of the base four signal 404 representing the same number in FIG. 4, it can be seen that the data "99" can be sent as a two-bit representation in one-half the time.

The number of bits that can be transmitted at one time is only limited by the ability of the optical receiver to differentiate between the different wavelengths of light transmitted, or by the ability of an optical transmitter to transmit light of differentiable wavelengths. It will be appreciated that, even if the time required for such devices to receive or transmit such signals were greater than that required to transmit a single bit of data at a single wavelength, embodiments of the present invention still would provide increased data transmission speed. For each additional wavelength added at which a bit of data can be transmitted, transmission speed increases by a power of two. Accordingly, from a one-bit transmission to a two-bit transmission, the rate of data transmission increases by a factor of two, as depicted in the improvement in data transmission speed between the graph 300 (FIG. 3) of the one-bit signal 304 and the graph 400 (FIG. 4) of the two-bit signal 404. Similarly, from a one-bit transmission to a four-bit transmission, the rate of data transmission increases by a factor of four, and so on. Accordingly, even if generation and differentiation of light signals comprising a plurality of wavelengths necessitated in a longer time interval for each pulse as compared to single-wavelength generation and differentiation, as long as the time interval does not increase by a factor of two for each additional bit, the data transmission speed gains outweigh any time lost in processing such transmissions.

Figure 5:
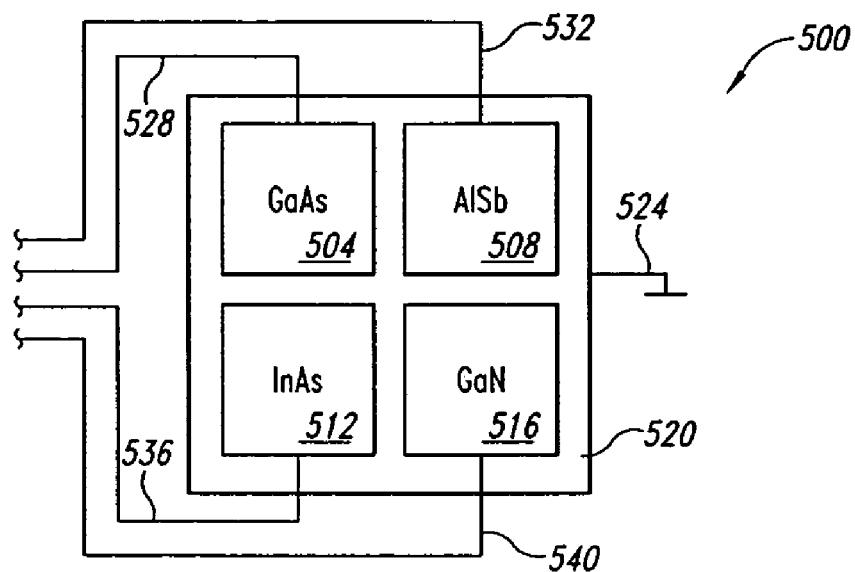
FIG. 5 is a structural diagram of an optical data transmission device capable of transmitting multiple data bits in a single pulse.

Embodiments of the present invention employ optical data transmission devices capable of generating optical signals at a plurality of wavelengths. More specifically, as shown in FIG. 5, an optical data transmitter used by an embodiment of the present invention comprises a light emitting diode ("LED") having a bond pad supporting a plurality of light emitting sections each of which is comprised of a different light emitting material. As is known in the art, the molecular composition of the material used in an LED determines the wavelength of the light it generates when electrically stimulated. The optical data transmitter could also use light emitting elements such as lasers.

More specifically, the optical transmitter 500 shown in FIG. 5 comprises four separate light emitting sections 504, 508, 512, and 516, disposed on a bond pad 520. In the embodiment shown the four light emitting sections 504, 508, 512, and 516, include a section comprised of gallium arsenide (GaAs) 504, a section comprised of aluminum antimonide (AlSb) 508, a section of indium arsenide (InAs) 512, and a section of gallium nitride (GaN) 516. Each of these materials, when electrically stimulated, generates light at different wavelengths. For example, when excited gallium arsenide emits light showing as red in the visible spectrum, while gallium nitride emits light showing as blue in the visible spectrum. Each of the sections 504, 508, 512, and 516 is connected to a common cathode 524, but each is individually controlled by an individual anode 528, 532, 536, and 540, respectively.

With the optical transmitter simultaneously able to generate light at four different wavelengths, each pulse of light can represent a four-bit representation of data. In other words, each pulse of the optical transmitter can represent a base four digit, and each base four digit can represent one of sixteen different possible signals. Thus, whereas a monochromatic light emitting device can generate one of only two different possible signals, on or off, an optical transmitter capable of generating a four-bit representation can transmit eight times as much information in the same pulse.

The anodes 528, 532, 536, and 540 could be connected to a controller (not shown) operable to synchronously and simultaneously activate each of the sections 504, 508, 512, and 516. As previously described, the optical transmitter 500, having four emitting regions 504, 508, 512, and 516, can transmit four-bit/base four values in a single pulse. Accordingly, the controller (not shown) may accept bytes of data to be transmitted, break each down into half-byte sections, and transmit the data one half-byte at a time by applying the four-bit half-byte binary sequence to the anodes 528, 532, 536, and 540 of the optical transmitter.

Similarly, complementary photoreceptors (not shown) generate measurable currents upon receiving light at the characteristic wavelength of the material from which its receptor sections are comprised, but not light at other wavelengths. Thus, for example, if the gallium arsenide section 504 of the optical transmitter 500 was stimulated to generate light during a clock interval, but the other three sections 508, 512, and 516, of the optical transmitter 500 were not stimulated, then only section of the photoreceptor responsive to the light generated by the gallium arsenide section 504 of the optical transmitter 500 would generate a reactive current. Only its terminal on the photoreceptor would generate a current which, in turn, could be read by a decoding device associated with the photoreceptor. Similarly, any combination of the wavelengths detected would stimulate zero, one, two, three, or four of the sections, resulting in output currents on the respective number of output terminals. Received by an associated decoding device, these received signals could signify any of the sixteen possible combinations per optical transmitter pulse the optical transmitter and photoreceptor pair are capable of communicating.

Optical transmitters and photoreceptors equipped with additional sections of separately controllable emitting sections could further increase the data transmission rate by increasing the number of combinations of data that could be sent during one pulse of the optical transmitter. If the optical transmitter had five sections, it could transmit one of the thirty-two possible combinations at one time. If the optical transmitter had eight sections, it could transmit two-hundred-fifty-six combinations, the equivalent of a whole byte of data at one time. For every additional section added, the rate at which data can be transmitted during a single optical transmitter pulse increases by a power of two. The only limit to the amount of data that can be transmitted in a single optical transmitter burst is the specificity of the optical sensor to generate light at differentiable wavelengths, and the sensitivity of the photoreceptor to differentiate among those wavelengths.

Figure 6A:
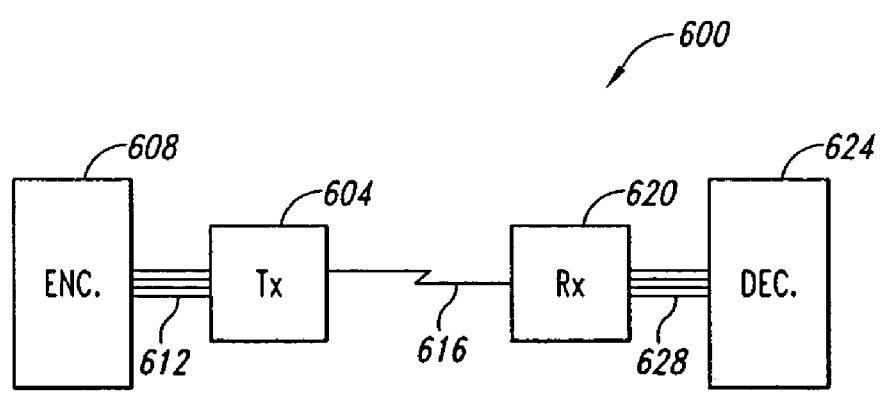
FIG. 6A is a block diagram of an optical data transmission subsystem for encoding, transmitting, receiving, and decoding a multiple bit optical data stream.

FIG. 6A shows a block diagram of a transmission subsystem 600 using an embodiment of the present invention. The subsystem includes five principal components: an optical transmitter 604; an encoder or controller 608 driving the separate sections (not shown) of the optical transmitter 604 through separate anodes 612; an optical transmission medium 616; a photoreceptor 620; and a decoder 624, receiving the currents generated at the terminals 628 of the separate photoreceptive sections (not shown). For purposes of this explanation, it is assumed that the optical transmitter 604 of the subsystem 600 of FIG. 6A is like that shown in the diagram of the optical transmitter 500 shown in FIG. 5, and a complementary photoreceptor so that each pulse of the optical transmitter can transmit a four-bit representation of data.

The encoder 608 receives data from a transmitting system (not shown). The encoder 608 divides the data into four-bit blocks of data. For each four-bit block transmitted, the encoder 608 individually stimulates the anodes 612 activating the separate sections (not shown) of the optical transmitter 604 by applying a suitable voltage to the appropriate anode or anodes. For example, if the four-bit representation is for the number "0," the encoder 608 may direct each of the light emitting sections not to discharge light. On the other hand, if the representation is for the number "15," the highest base four numeral, the encoder 608 may direct each of the light emitting sections to discharge light.

Once the optical signals have been generated and transmitted through the optical medium 616, the reverse process occurs. The photoreactive sections of the photoreceptor 620 react to received light, generating an electrical response at the photoreceptor's terminals 628, the output of which are supplied to the decoder 624. The decoder 624 detects the electrical responses, and outputs the data that previously was encoded and transmitted. It will be appreciated that the correspondence between each light emitting section of the optical transmitter and what it represents can be chosen by any convention observed by the photoreceptor. For example, the gallium arsenide section of the optical transmitter can represent the least significant bit, the most significant bit, or either of the intermediate bits, as long as the decoder for the photoreceptor is programmed to attach the same significance to each bit.

Figure 6B:
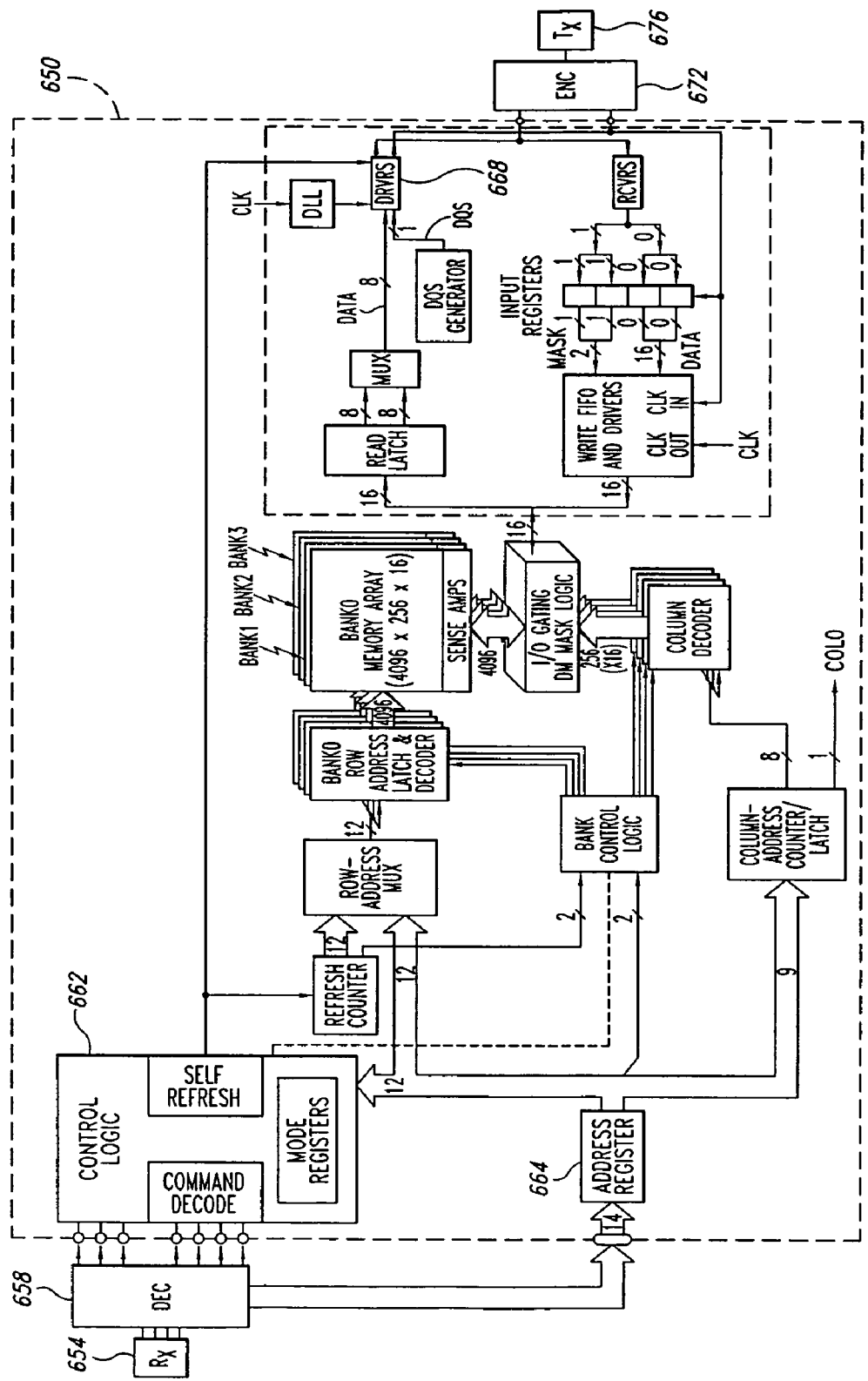
FIG. 6B is a block diagram of a conventional memory device equipped with a multiple bit optical receiver and an optical transmitter using an embodiment of the present invention.

FIG. 6B shows a conventional DRAM device 650 equipped with an optical receiver 654, a decoder 658, an encoder 672, and an optical transmitter 676. As in FIG. 6A, the output of the optical receiver 654 is decoded into electrical signals by the decoder 658. These signals are applied to input lines of the control logic 662 and the address register 664 of the DRAM device. The control logic 662 and the address register 664 thereby receive electrical signals as though they were communicated to the DRAM device 650 electrically instead of optically. Similarly, the output drivers 668 of the DRAM device 650 are coupled to an encoder 672 which translates the electrical output signals of the output drivers 668 into signals that can be transmitted by the optical transmitter 676. It will be appreciated that the decoder 658 and encoder 672 could be integrated within the DRAM device 650. Specifically, the decoder 658 could be incorporated within the control logic 662, and the encoder 672 could be integrated with the output drivers 668. Similarly, the optical receiver 654 and optical transmitter 676 could be integrated within the device as well, as long as optical conduits to communicate optical signals to and from these devices are provided, respectively. It will further be appreciated that, if the DRAM device 650 is a single bit DRAM array, the optical transmitter 676 could be a single bit optical transmitter. In a network of such devices, the output signals generated by single bit optical transmitters associated with each device could transmit on different wavelengths to be simultaneously received and processed by a multiple wavelength photoreceptor to maintain the transmission speed enhancements permitted by the multiple bit optical transmission devices contemplated by the present invention.

Figure 7:
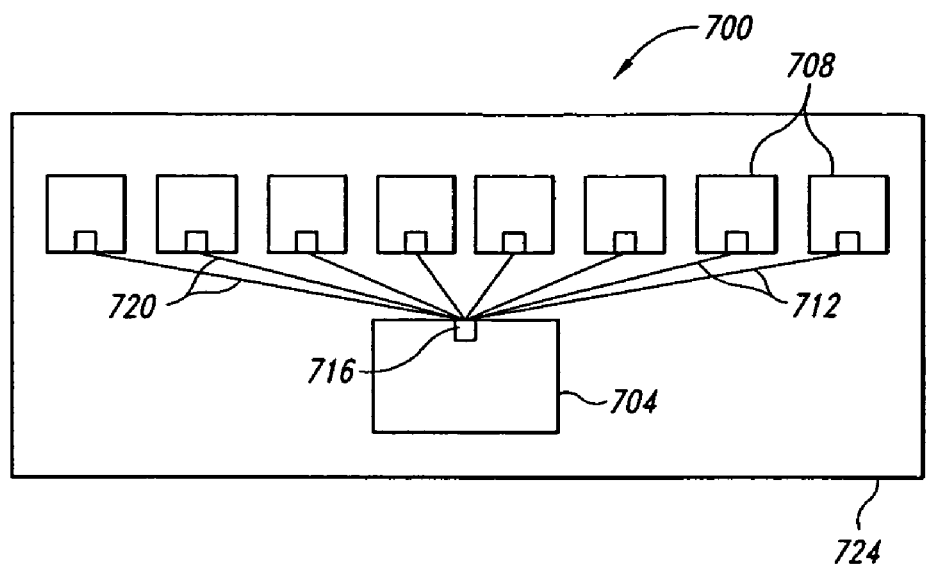
FIG. 7 is a block diagram of a memory module including a register or hub and associated memory devices using an embodiment of the present invention.

FIG. 7 is a block diagram of a memory module 700 which employs an embodiment of the present invention to communicate multiple bits of data between a register or hub 704 and the memory devices 708. Each of the memory devices 708 is equipped with an optical transceiver 712 using an embodiment of the present invention which communicates with the register 704 through a hub optical transceiver 716. Embodiments of the present invention could be used in many forms on the memory module 700. More specifically, the optical communications connections 720 could either be free space, line of sight connections in which the sending transceiver generates a light signal which is directly received through the ambient medium by the receiving transceiver. Alternatively, the optical communications connections 720 could be a reflective medium or wave guide, such as a fiber optic connection. In such an embodiment, the fiber optic connections can be incorporated into the substrate 724 of the memory module 700, as disclosed, for example, in U.S. Pat. No. 6,233, 376 to Updegrove. For example, the substrate 724 of the memory module 700 may have an embedded fiber optic matrix through which each of the memory devices 708 is optically coupled to the register or hub 704.

In addition, the number and usage of the optical data transceivers could take on various forms. For reading from memory, for example, the hub transceiver 716 could receive data from the memory devices 708 through time-sliced multiplexing. A common signal might be sent to the memory devices 708 because each memory device will either be reading data from the same address within each memory device 708. However, the memory devices 708 might respond sequentially with the bit stored at that address, and be received by the hub transceiver 716 in a predetermined order such that the data word can be assembled and communicated to the system controller (not shown). Similarly, when writing to memory, the hub controller 716 could sequentially activate each memory device 708 as the data bit to be written to each individual memory device 708 was being transmitted, by sequencing through device select signals enabling each individual memory device 708 as part of the data transmission.

In still another form, the multiple bit optical data transceiver herein described could be used as the hub transceiver 716 to send multiple bit address and control signals, and a multiple bit receiver could be used by each of the memory devices 708 to receive the multiple bit address and control signals, while a dedicated single-bit diode transceiver could be used to actually communicate the respective data bit to be written to or read from each memory device 708. In still another form, the hub transceiver 716 could be a multiple bit transceiver to send address and control information to the memory devices, each memory device could use a multiple bit receiver to receive that information, and each memory device could transmit and receive data bits on a different wavelength. In this way, data could be sent from the hub transceiver to all of the memory devices at once, using wavelength-sliced multiplexing instead of time-sliced multiplexing, saving time. In sum, use of a multiple bit transceiver to communicate data between the register and the memory devices opens a number of opportunities for efficient data communications within each module.

Figure 8:
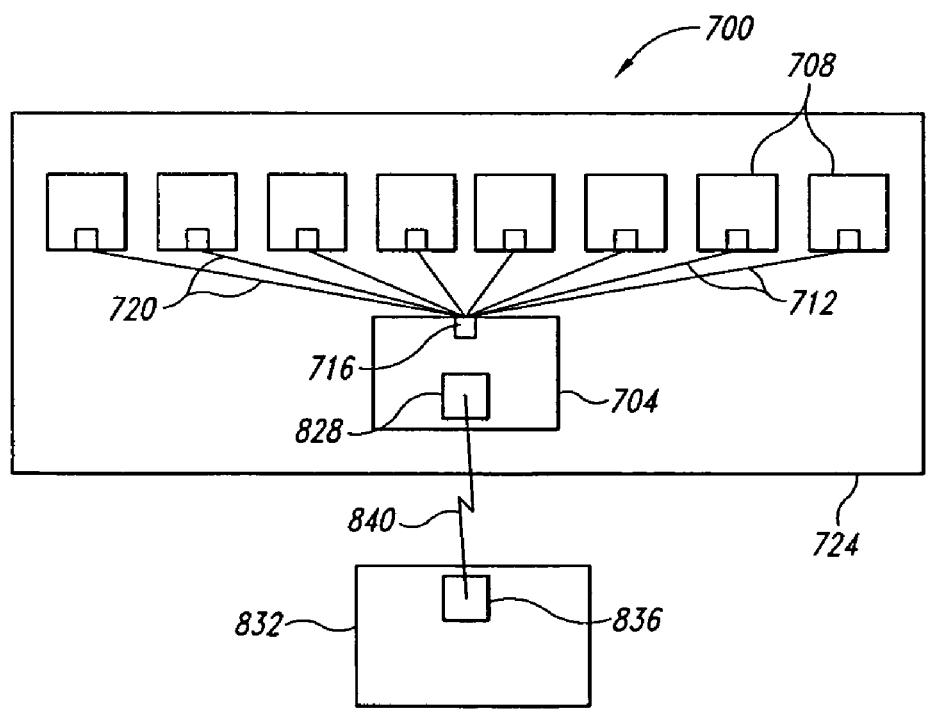
FIG. 8 is a block diagram of a portion of a computer system including a memory module in communication with a system controller using an embodiment of the present invention.

Improving communications efficiency using embodiments of the present invention, however, is not limited to intramodule communications. FIG. 8 is a block diagram of a memory module 700 in optical communication with a system controller 832. The memory system shown in FIG. 8 comprises most of the same components used in the system shown in FIG. 7, thus, in the interest of brevity, these components have been provided with the same reference numerals, and an explanation of their functions and operations will not be repeated. The system controller 832 manages the flow of information between a system bus (not shown) and memory, storage, input/output, and other devices (not shown). More specifically, the system controller 832 receives commands, data, and other information from the system bus (not shown), determines to which devices the information should be directed, and communicates that information to these other devices as appropriate. Similarly, the system controller 832 receives data from the memory and other devices and communicates that information to the system bus. Conventionally, signals are communicated from the system controller 832 to the other devices using electrical signals carried over conductive connectors.

FIG. 8 shows an embodiment of the present invention in which, instead of the system controller 832 communicating with memory modules 700 through conductive connectors, the system controller 832 communicates optically with the memory modules 700 using multiple bit optical data transmission. The system controller 832 is equipped with a master multiple bit optical transceiver 836 which communicates with slave multiple bit optical transceivers 828 disposed on the hub 704 of each memory module 700. The master transceiver 836 communicates optically with the slave transceivers 828 through an optically conductive medium 840, which may be a free space, line-of-sight optical medium, a suitable fiber optic connection, or some other optical coupling medium.

Using the multiple bit optical transmission system previously described, the master transceiver 836 can simultaneously transmit multiple bit sequences of data in a single pulse of the optical transmitter, and can simultaneously receive multiple bit sequences of data in a single pulse of a slave optical transceiver 828 associated with each memory module. This multiple bit data stream could incorporate a device select sequence to singularly identify which of a plurality of memory modules is being addressed. To accommodate the number of bits required to communicate all the data, address, and control information from the system controller 832 to a memory module 700 might require optical transceivers with a great number of light generating and reactive sections in a single pulse. If this is impractical, the multiple bit transmissions could be time-slice multiplexed to generate as many pulses as needed to communicate the full data stream.

Upon the data stream being received by the hub 704 of the memory module 700, the hub 704 could communicate the data optically to each of the memory devices 708 as shown and as previously described. The data streams could be insulated from each other if either the data stream between the hub 704 and the memory devices 708 or between the system controller 832 and the hub were carried over fiber optic connectors, or if the optical transceivers within the module 700 and between the module 700 and the system controller 832 were otherwise shielded from each other. Alternatively, interference would pose no concern if communications within the module 700 and between the module 700 and the system controller 832 used different ranges of wavelengths. On the other hand, an embodiment of the present invention could take advantage of multiple bit optical data transmission to transfer data between the system controller 832 and the hub 704 of the memory modules 700, and then the hub 704 could communicate with the memory devices 708 conventionally, communicating in electrical signals over conductive connectors, eliminating the concern of interference. Similarly, if optical communication were within the module 700, and conventional communications in the form of electrical signals over conventional conductive connectors were used between the module 700 and the system controller 832, this concern of interference also would be eliminated.

Figure 9:
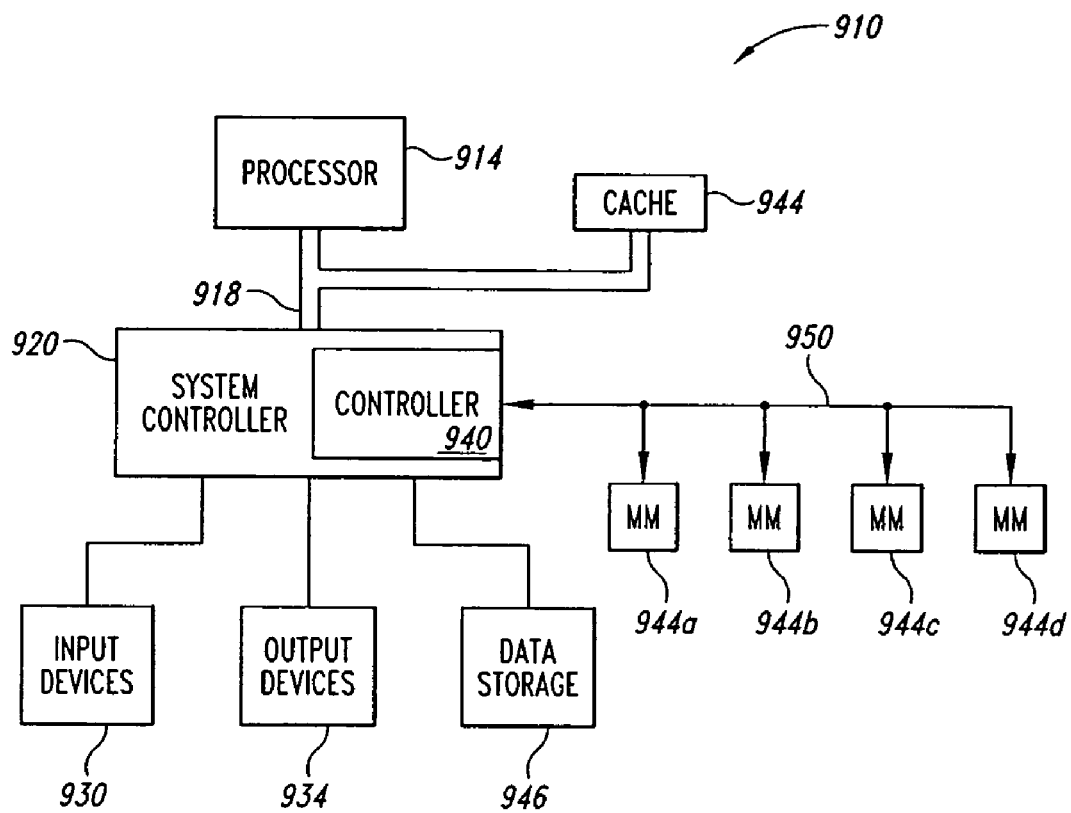
FIG. 9 is a block diagram of a computer system incorporating an embodiment of the present invention for multiple bit optical data transmission.

A computer system 910 using the controller 940 and a memory system using a multiple bit optical data communications system according to an embodiment of the invention is shown in FIG. 9. The computer system 910 includes a processor 914 for performing various computing functions, such as executing specific software to perform specific calculations or tasks. The processor 914 includes a processor bus 918 that normally includes an address bus, a control bus, and a data bus. The computer system 910 includes a system controller 920 that is coupled to the processor bus 918. The system controller 920 also includes the controller 940, which is, in turn, optically coupled to memory modules 944a, 944b, 944c, and 944d through the optical communication path 950. However, it will be understood that the controller 940 may be external to the system controller 920 and coupled to it or some other component in the computer system 910, such as the processor 914. In addition, the computer system 910 includes one or more input devices 930, such as a keyboard or a mouse, coupled to the processor 914 through the system controller 920 to allow an operator to interface with the computer system 910. Typically, the computer system 910 also includes one or more output devices 934 coupled to the processor 914 through the system controller 920, such output devices typically being a printer or a video terminal. One or more data storage devices 946 are also typically coupled to the processor 914 through the system controller 920 to allow the processor 914 to store data or retrieve data from internal or external storage media (not shown). Examples of typical storage devices 946 include hard and floppy disks, tape cassettes, and compact disk read-only memories (CD-ROMs). The processor 914 is also typically coupled to cache memory 944, which is usually static random access memory ("SRAM").

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory device comprising:
an array of memory cells;
a control/address unit coupled with the array of memory cells, the control/address unit receiving and responding to control signals, address signals, and data write signals;
an optical receiver coupled with the control/address unit and the array of memory cells, the optical receiver being operable to receive a multiple bit optical signal comprising a plurality of wavelengths of light, combinations of the plurality of wavelengths of light representing a combination of data bits in each transmission pulse, the optical receiver further operable to decode the multiple bit optical reception signal into the control signals, the address signals, and the data write signals; and
an optical transmitter coupled with the array of memory cells operable to communicate data read signals.

2. The memory device of claim 1 wherein the optical receiver comprises a photoreceptor including a plurality of light sensitive materials each of which is structured to generate an electrical current upon receiving light of a particular range of wavelengths.

3. The memory device of claim 2 wherein a number of possible data sequences that can be distinguished by the photoreceptor is equal to two to the power of the plurality of light sensitive materials.

4. The memory device of claim 1 wherein the wavelengths are within a visible spectrum of light.

5. The memory device of claim 1 wherein the wavelengths are outside a visible spectrum of light.

6. The memory device of claim 1 further comprising an optical transmission medium structured to couple the optical transmitter to an external system.

7. The memory device of claim 6 wherein the optical transmission medium comprises a free space medium.

8. The memory device of claim 6 wherein the optical transmission medium comprises a reflective medium.

9. The memory device of claim 6 wherein the optical transmission medium comprises a fiber optic medium.

10. The memory device of claim 1 further comprising an optical transmission medium structured to couple the optical receiver to an external system.

11. The memory device of claim 10 wherein the optical transmission medium comprises a free space medium.

12. The memory device of claim 10 wherein the optical transmission medium comprises a reflective medium.

13. The memory device of claim 10 wherein the optical transmission medium comprises a fiber optic medium.

14. The memory device of claim 1 wherein the memory device is structured to receive the multiple bit optical reception signal directly from a system controller without being routed through a memory hub.

15. A memory hub for selectively communicating data between a system and a plurality of associated system memory devices communicably coupled with the memory hub, the memory hub comprising:
a hub control unit, the hub control unit coupled to receive incoming control signals, address signals, and data write signals and structured to route a memory control signal, a memory address signal, and a memory data write signal to at least one of the associated memory devices based on the contents of the control signal, the address signal, and the data signal, the memory hub control unit being further coupled to receive data read signals from the associated memory devices and structured to relay the data read information to the system, and
a multiple bit optical transceiver coupled with the hub control unit and structured to communicate multiple bit optical signals comprising a plurality of wavelengths of light, combinations of the plurality of wavelengths of light representing a combination of data bits in each transmission pulse, the multiple bit optical transceiver further structured to decode an incoming multiple bit optical signal into incoming electrical signals understandable by the hub control unit, and further structured to encode outgoing electrical signals into an outgoing multiple bit optical signal.

16. The memory hub of claim 15 wherein the multiple bit optical transceiver comprises a light emitting device comprising a plurality of light emitting elements each of which is structured to generate light in a particular range of wavelengths upon being electrically stimulated.

17. The memory hub of claim 16 wherein a number of possible data sequences that can be signified by the optical transceiver is equal to two to the power of a number of the light emitting elements.

18. The memory hub of claim 16 wherein the light emitting elements comprise light emitting diodes.

19. The memory hub of claim 16 wherein the light emitting elements comprise lasers.

20. The memory hub of claim 15 wherein the multiple bit optical transceiver comprises a photoreceptor including a plurality of light sensitive materials each of which is structured to generate an electrical current upon receiving light of a particular range of wavelengths.

21. The memory hub of claim 20 wherein a number of possible data sequences that can be distinguished by the photoreceptor is equal to two to the power of the plurality of light sensitive materials.

22. The memory hub of claim 15 wherein the wavelengths are within a visible spectrum of light.

23. The memory hub of claim 15 wherein the wavelengths are outside a visible spectrum of light.

24. The memory hub of claim 15 further comprising an optical medium coupled to the multiple bit optical transceiver, wherein the multiple bit optical transmission signal generated is communicated through the optical medium.

25. The memory hub of claim 24 wherein the optical medium comprises a free space medium.

26. The memory hub of claim 24 wherein the optical medium comprises a reflective medium.

27. The memory hub of claim 24 wherein the optical medium comprises a fiber optic medium.

28. A memory module, comprising:
an insulative substrate;
an optical memory hub mounted on the substrate, the optical memory hub having a primary optical transceiver operable to transmit a multiple bit optical control signal comprising a plurality of wavelengths of light, each combination of wavelengths of light representing a data sequence comprising a plurality of control signals, data signals, and address signals, the primary optical transceiver further being coupled to receive optical data signals;
a plurality of optical memory devices mounted on the substrate, each of the optical memory devices having a secondary optical transceiver coupled to receive the multiple bit optical control signal and being structured to transmit optical data signals; and
an optical transmission medium structured to optically couple the primary optical transceiver of the optical memory hub and the secondary optical transceiver of each of the plurality of optical memory devices.

29. The memory module of claim 28 wherein the primary optical transceiver comprises a light emitting device including a plurality of light emitting elements each of which is structured to generate light in a particular range of wavelengths upon being electrically stimulated.

30. The memory module of claim 29 wherein a number of possible data sequences that can be signified by the primary optical transceiver is equal to two to the power of a number of the light emitting elements.

31. The memory module of claim 29 wherein the light emitting elements comprise light emitting diodes.

32. The memory module of claim 29 wherein the light emitting elements comprise lasers.

33. The memory module of claim 28 wherein the primary optical transceiver comprises a photoreceptor including a plurality of light sensitive materials each of which is structured to generate an electrical current upon receiving light of a particular range of wavelengths.

34. The memory module of claim 33 wherein a number of possible data sequences that can be distinguished by the photoreceptor is equal to two to the power of the plurality of light sensitive materials.

35. The memory module of claim 28 wherein the wavelengths are within a visible spectrum of light.

36. The memory module of claim 28 wherein the wavelengths are outside a visible spectrum of light.

37. The memory module of claim 28 wherein the optical transmission medium comprises a free space medium.

38. The memory module of claim 28 wherein the optical transmission medium comprises a reflective medium.

39. The memory module of claim 28 wherein the optical transmission medium comprises a fiber optic medium.

40. The memory module of claim 28 wherein the substrate comprises an embedded fiber optic matrix through which each of the memory devices is optically coupled to the memory hub.

41. A computer system, comprising:
a processor;
an input device operably connected to the processor and being structured to allow data to be entered into the computer system;
an output device operably connected to the processor and being structured to allow data to be output from the computer system; and
a system memory operably connected to the processor and being coupled to receive memory control signals from the processor, the system memory comprising a plurality of memory modules, each of the memory modules comprising:
an insulative substrate;
an optical memory hub mounted on the substrate, the optical memory hub having a primary optical transceiver operable to transmit a multiple bit optical control signal comprising a plurality of wavelengths of light, each combination of wavelengths of light representing a data sequence comprising a plurality of control signals, data signals, and address signals, the primary optical transceiver further being operable to receive optical data signals;
a plurality of optical memory devices mounted on the substrate, each of the optical memory devices having a secondary optical transceiver structured to receive the multiple bit optical control signal, and transmit optical data signals; and
an optical transmission medium structured to optically couple the primary optical transceiver of the optical memory hub and the secondary optical transceiver of each of the plurality of optical memory devices.

42. The system of claim 41 wherein the primary optical transceiver comprises a light emitting device including a plurality of light emitting elements each of which is structured to generate light in a particular range of wavelengths upon being electrically stimulated.

43. The system of claim 42 wherein a number of possible data sequences that can be signified by the primary optical transceiver is equal to two to the power of a number of the light emitting elements.

44. The system of claim 42 wherein the light emitting elements comprise light emitting diodes.

45. The system of claim 42 wherein the light emitting elements comprise lasers.

46. The system of claim 41 wherein the primary optical transceiver comprises a photoreceptor comprising a plurality of light sensitive materials each of which is structured to generate an electrical current upon receiving light of a particular range of wavelengths.

47. The system of claim 46 wherein a number of possible data sequences that can be distinguished by the photoreceptor is equal to two to the power of the plurality of light sensitive materials.

48. The system of claim 41 wherein the wavelengths are within a visible spectrum of light.

49. The system of claim 41 wherein the wavelengths are outside a visible spectrum of light.

50. The system of claim 41 wherein the optical transmission medium comprises a free space medium.

51. The system of claim 41 wherein the optical transmission medium comprises a reflective medium.

52. The system of claim 41 wherein the optical transmission medium comprises a fiber optic medium.

53. The system of claim 41 wherein the substrate comprises an embedded fiber optic matrix through which each of the memory devices is optically coupled to the memory hub.

54. A computer system, comprising:
a processor;
an input device operably connected to the processor and structured to allow data to be entered into the computer system;
an output device operably connected to the processor and structured to allow data to be output from the computer system; and a system memory operably connected to the processor and coupled to receive memory control signals from the processor, the system memory comprising:

an optical memory controller, the optical memory controller having a primary optical transceiver structured to transmit a multiple bit optical control signal comprising a plurality of wavelengths of light, each combination of wavelengths of light representing a data sequence comprising a plurality of control signals, data signals, and address signals, the primary optical transceiver being further coupled to receive optical data signals;

a plurality of optical memory devices mounted on the substrate, each of the optical memory devices having a secondary optical transceiver coupled to receive the multiple bit optical control signal and being structured to transmit optical data signals; and an optical transmission medium structured to optically couple the primary optical transceiver of the optical memory controller and the secondary optical transceiver of each of the plurality of optical memory devices.

55. The system of claim 54 wherein the primary optical transceiver comprises a light emitting device including a plurality of light emitting elements each of which is structured to generate light in a particular range of wavelengths upon being electrically stimulated.

56. The system of claim 55 wherein a number of possible data sequences that can be signified by the primary optical transceiver is equal to two to the power of a number of the light emitting elements.

57. The system of claim 54 wherein the light emitting elements comprise light emitting diodes.

58. The system of claim 54 wherein the light emitting elements comprise lasers.

59. The system of claim 54 wherein the primary optical transceiver comprises a photoreceptor comprising a plurality of light sensitive materials each of which is structured to generate an electrical current upon receiving light of a particular range of wavelengths.

60. The system of claim 59 wherein a number of possible data sequences that can be distinguished by the photoreceptor is equal to two to the power of the plurality of light sensitive materials.

61. The system of claim 54 wherein the wavelengths are within a visible spectrum of light.

62. The system of claim 54 wherein the wavelengths are outside a visible spectrum of light.

63. The system of claim 54 wherein the optical transmission medium comprises a free space medium.

64. The system of claim 54 wherein the optical transmission medium comprises a reflective medium.

65. The system of claim 54 wherein the optical transmission medium comprises a fiber optic medium.

66. The system of claim 54 wherein the optical transmission medium comprises fiber optic matrix embedded in a computer system circuit board through which each of the memory devices is optically coupled to the optical memory controller.

67. A method for communicating data in a memory system, comprising:

transmitting to a memory storage device multi-bit optical signal comprising a plurality of wavelengths of light, each of the wavelengths representing a bit comprising part of a data sequence;

receiving at the memory storage device the multi-bit optical signal through an optical transmission medium;

decoding the multi-bit optical signal, correlating each of the plurality of wavelengths of light with the bit each of the wavelengths represents in comprising part of the data sequence; and applying data sequence to the memory storage device.

68. The method of claim 67 wherein the wavelengths are within a visible spectrum of light.

69. The method of claim 67 wherein the wavelengths are outside a visible spectrum of light.

70. The method of claim 67 wherein a number of bits of data which can be received at one time is equal to two raised to a power of the plurality of wavelengths.

71. The method of claim 67 wherein the multi-bit optical signal is transmitted using line of sight transmission.

72. The method of claim 67 wherein the multi-bit optical signal is transmitted using reflective transmission.

73. The method of claim 67 wherein the multi-bit optical signal is transmitted through a fiber optic medium.

74. A method for communicating data in a memory system, comprising:

transmitting to a memory device multi-bit optical signal comprising a plurality of wavelengths of light by selectively applying an electric current to a plurality of light emitting sections of a light emitting material, each of the sections emitting light at a wavelength representing a bit comprising part of the data;

receiving at the memory storage device the multi-bit optical signal through an optical transmission medium;

decoding the multi-bit optical signal by applying the optical signal to a plurality of receiving sections of light sensitive materials, each of the light sensitive materials reacting to light at a received wavelength by generating an electric current, a plurality of the received wavelengths corresponding to the plurality of wavelengths generated by the light emitting materials;

sensing changes in the electrical current generated by each of the light receiving sections, correlating each of the plurality of wavelengths of light with the bit each of the wavelengths represents in comprising part of the data sequence; and applying data sequence to the memory device.

75. The method of claim 74 wherein the memory device is a memory hub.

76. The method of claim 74 wherein the memory device is a memory storage device.

77. The method of claim 74 wherein the wavelengths are within a visible spectrum of light.

78. The method of claim 74 wherein the wavelengths are outside a visible spectrum of light.

79. The method of claim 74 wherein a number of bits of data which can be received at one time is equal to two raised to a power of the plurality of wavelengths.

80. The method of claim 74 wherein the multi-bit optical signal is transmitted using line of sight transmission.

81. The method of claim 74 wherein the multi-bit optical signal is transmitted using reflective transmission.

82. The method of claim 74 wherein the multi-bit optical signal is transmitted through a fiber optic medium.

* * * * *

UNITED STATES PATENT AND TRADEMARK OFFICE
CERTIFICATE OF CORRECTION

| | | |
|---|---|---|
| PATENT NO. | : 7,489,875 B2 | Page 1 of 1 |
| APPLICATION NO. | : 11/432015 | |
| DATED | : February 10, 2009 | |
| INVENTOR(S) | : Murphy | |

It is certified that error appears in the above-identified patent and that said Letters Patent is hereby corrected as shown below:

In column 1, line 8, after "of" delete "pending".

In column 1, line 9, delete "2002." and insert -- 2002, now U.S. Pat. No. 7,254,331. --, therefor.

Signed and Sealed this

Fifth Day of May, 2009

JOHN DOLL
*Acting Director of the United States Patent and Trademark Office*